United States Patent [19]

Kanai et al.

[11] Patent Number: 4,474,464
[45] Date of Patent: Oct. 2, 1984

[54] SHUTTER DEVICE FOR PHOTOGRAPHIC PRINTER

[75] Inventors: Makoto Kanai; Eiichi Kito; Kanji Tokuda, all of Kanagawa, Japan

[73] Assignee: Fuji Photo Film Co., Ltd., Kanagawa, Japan

[21] Appl. No.: 471,376

[22] Filed: Mar. 2, 1983

[30] Foreign Application Priority Data

Mar. 2, 1982 [JP] Japan ................................ 57/32799

[51] Int. Cl.³ .............................................. G03B 27/72
[52] U.S. Cl. ................................... 355/71; 354/234.1; 354/253
[58] Field of Search ....................... 355/71, 32, 35, 36; 354/250, 253, 234, 254

[56] References Cited

U.S. PATENT DOCUMENTS 378,426 2/1888 Bliss et al. ...................... 354/234 X Primary Examiner—L. T. Hix
Assistant Examiner—Brian W. Brown
Attorney, Agent, or Firm—Sughrue, Mion, Zinn, Macpeak & Seas

[57] ABSTRACT

A shutter device for a photographic printer includes a pair of paddle devices respectively driven by a pair of rotary solenoids. The solenoids are actuated such that one paddle moves to open the optical path to begin an exposure, and the other paddle moves to close the optical path to end the exposure, and remains in the optical path until moved to start a further exposure. In this manner, the opening and closing functions of the paddles are reversed with each exposure.

7 Claims, 6 Drawing Figures

SHUTTER DEVICE FOR PHOTOGRAPHIC PRINTER

BACKGROUND OF THE INVENTION

This invention relates to shutter devices for photographic printers, and more particularly to a shutter device which has a high response characteristic and is uniform in operation.

A photographic printer employs a shutter device for controlling printing exposure times. A conventional shutter device of this type has a shutter paddle which is driven by a rotary solenoid. In the shutter device, when current is applied to the rotary solenoid, the shutter paddle, which is in the printing optical path, is caused to move out of the printing optical path to start the exposure operation, and when the application of current is interrupted, the shutter paddle is caused to move into the printing optical path again by the force of a spring, to end the exposure operation.

In this shutter device, the shutter paddle is returned by a spring as described above. Therefore, the shutter device suffers from serious problems in that it has a low response characteristic and is low in reliability in operation. Furthermore, since the optical path is opened and closed by reciprocating one shutter paddle, the shutter device is disadvantageous in that the amount of exposure given the exposure surface is not always uniform.

SUMMARY OF THE INVENTION

In view of the foregoing, an object of this invention is to provide a shutter device in which the above-described difficulties accompanying a conventional shutter device have been eliminated and which is therefore high in response characteristic and reliability in operation and its uniform in exposure.

The foregoing object and other objects of the invention have been achieved by the provision of a shutter device for a photographic printer in which a shutter paddle is caused to move into and out of the printing optical path by means of a rotary solenoid; which, according to the invention, includes two shutter paddles arranged respectively on either side of the printing optical path; and two two-way energization type rotary solenoids of which the forward and reverse rotation thereof can be effected by the reverse of the polarity of the applied electrical source for driving the shutter paddles, and in which control is made in a manner such that after one of the shutter paddles is caused to move from the printing optical path to start a printing exposure operation, the other shutter paddle is caused to move into the printing optical path to end the printing exposure operation. In the next printing exposure operation, the shutter paddles are similarly operated with their functions switched.

BRIEF DESCRIPTION OF THE DRAWINGS

One embodiment of this invention will be described with reference to the accompanying drawings, in which.

DETAILED DESCRIPTION OF THE PREFERRED EMBODIMENTS

Figure 1:
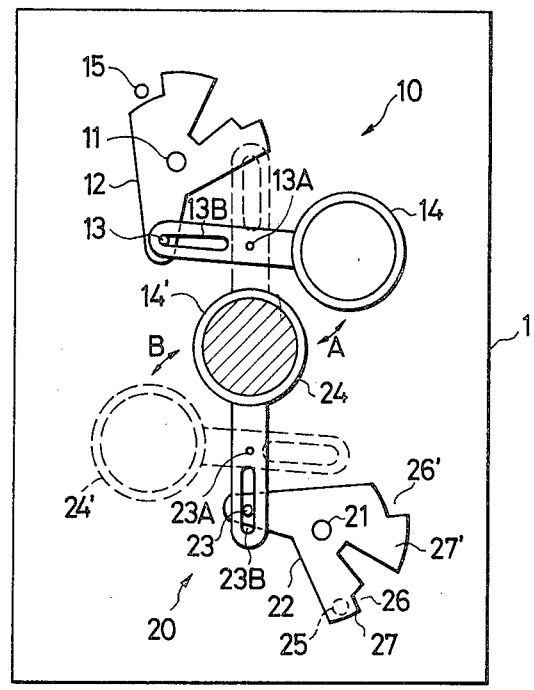
FIG. 1 is a plan view showing a shutter device according to one embodiment of this invention.

FIG. 1 is a plan view showing a shutter device according to one embodiment of the invention. In FIG. 1, reference numeral 10 designates a first shutter paddle drive system, and 20, a second shutter paddle drive system. These drive systems 10 and 20 comprise operating pieces 12 and 22 secured to the shafts 11 and 12 of two-way energization type rotary solenoids (not shown) which are mounted on a supporting plate 1; and shutter paddles 14 and 24 which are engaged through pins 13 and 23 with the operating pieces 12 and 22, respectively. The shutter paddles 14 and 24 are pivotally mounted on pins 13A and 23A, respectively. Therefore, as the two-way energization type rotary solenoids (hereinafter referred to merely as rotary solenoids) turn in a reciprocating manner, the shutter paddles 14 and 24 are swung in a reciprocating manner between the positions (14 and 24) indicated by the solid line and the positions (14' and 24') indicated by the dotted line with the aid of the pins 13 and 23 and elongated holes 13B and 23B, respectively.

The shaded portion corresponding to the positions of the shutter paddles (24 and 14') as shown is the printing optical path. The two shutter paddles operate to open and close the printing optical path alternately. The operating pieces 12 and 22 are fixedly mounted on the shafts 11 and 21 of the rotary solenoids, respectively, as described before. Therefore, the operating pieces 12 and 22 can transmit rotations of the rotary solenoids to the shutter paddles 14 and 24 and control, when required, the application of current of the rotary solenoids with the aid of photo-electric switches 15 and 25 thereby to smooth the operation thereof, respectively. These functions will now be described in more detail.

The device thus constructed operates primarily as follows: It is assumed that the two shutter paddles 14 and 24 are positioned as shown in FIG. 1, about to start a printing exposure operation. First, the second shutter paddle drive system 20 is driven to move the shutter paddle 24 to the position 24', i.e., to retract the shutter paddle 24 from the printing optical path to start the exposure. After a predetermined period of time, the first shutter paddle drive system 10 is driven to move the shutter paddle 14 to the position 14', i.e., to insert the shutter paddle 14 in the printing optical path, to thereby end the exposure. When the exposure is ended as described, the conditions (open and closed) of the two shutter paddles are opposite to the initial conditions thereof. Accordingly, in the next printing exposure operation, the order of operation of the shutter paddles 14 and 24 is reversed. Therefore, in the third printing exposure operation, the conditions of the shutter paddles are the same as that initially described.

Figure 2A:
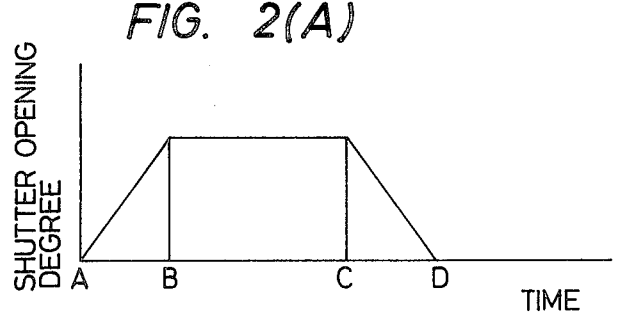
FIGS. 2(A) and 2(B) are graphical representations for comparing the operation of the shutter device of the invention with that of a conventional shutter device.

FIG. 2(A) shows the shutter opening degree during an exposure corresponding to the above-described operations. In FIG. 2(A), reference character A designates the exposure start time instant (when the shutter paddle 24 starts to swing to open the optical path); B, the time instant when the shutter paddle has moved to fully open the shutter; C, an exposure finish time instant (when the shutter paddle 14 starts to swing to close the optical path); and D, a time instant when the shutter paddle 14 have moved to completely close the shutter.

Figure 2B:
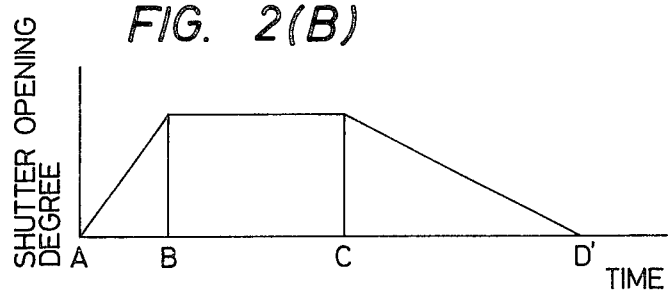

As is apparent from a comparison of FIG. 2(A) with FIG. 2(B), which shows the shutter opening degree in a conventional shutter device, the time interval between the exposure finish time instant (the point C) and the time instant (the point D') when the shutter has been closed is longer. This is a drawback attributed to the fact that, in the conventional shutter device, the shutter paddle is returned to the optical path by the force of a spring as described before. On the other hand, in the shutter device of the invention, the shutter opening degree of which is as indicated in FIG. 2(A), the shutter paddles are swung by energizing the rotary solenoids to both open and to close the shutter. Therefore, the shutter device of the invention has an excellent response characteristic and is reliable in operation.

Figure 3:
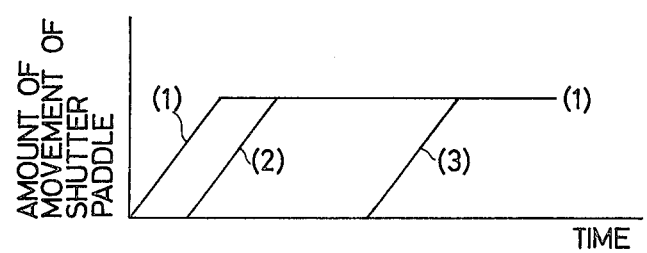
FIG. 3 is a graphical representation indicating the operation of the device of the invention in detail.

Furthermore, in the shutter device of the invention, to two shutter paddles are moved similarly to the focal-plane shutter of a camera. Accordingly, the shutter speed (exposure time) can be made very small, with the entire surface subjected to uniform exposure. This will become more apparent from FIG. 3. In FIG. 3, reference numeral 1 designates the operation of the shutter paddle 24 to open the optical path; and 2 and 3, operations of the shutter paddle 14 to close the optical path. Operation 3 is for a relatively long exposure time, and operation 2 is for an extremely short exposure time.

The shutter device of the invention operates similarly to the focal-plane shutter of a camera, as described above. However, the former is different from the latter in that it is unnecessary to restore the shutter device every exposure; that is, the preparation time for the next exposure is eliminated. The shutter paddles make one reciprocation every two exposure operations, and accordingly the service life of the shutter device of the invention is longer than that of the conventional device.

The operation of smoothing the operations of the rotary solenoids by the operating pieces 12 and 22 will now be described.

When the shutter paddle is turned by the rotary solenoid, a problem is sometimes created such that as the speed of rotation increases, the noise or sound is increased when the shutter paddle strikes the stopper. In the invention, the operations of the rotary solenoids are controlled by the utilization of the operating pieces 12 and 22, which are driven by the rotary solenoids. More specifically, control means are provided to control the outputs of the photoelectric switches 15 and 25 provided for the operating pieces, respectively, so that the operation of the operating pieces 12 and 22 are converted into the outputs of the photoelectric switches 15 and 25, which are fed back to the rotary solenoids, whereby application of the current to the rotary solenoids is more finely controlled.

The function of the photoelectric switches 15 and 25 will be briefly described below.

The photoelectric switches comprise a light emitter having a light source, a light receptor for detecting light emitted from the light source and an output part for converting received light signals into electrical signals and outputting the electrical signals as a ON-OFF signal to the outside. The ON or OFF operation is controlled by the existence non-existence of a light shield between the light source and the light receptor. The so-called reflection type photoelectric switch may be used such that the light emitted from the light source is reflected by a reflective material such as a metal having a relatively large light reflection rate, and the reflected light is received by the light receptor. Generally, in such a photoelectric switch, the light source and the light receptor are integrally formed. In the present invention, other types of photoelectric switches are applicable as well.

Figure 4A:
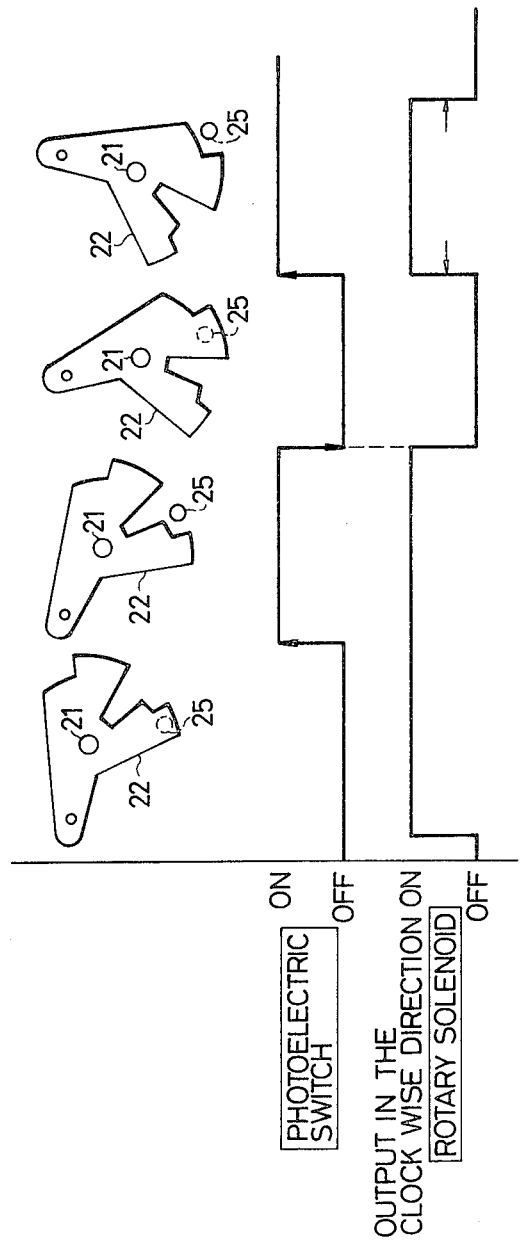
FIGS. 4(A) and 4(B) illustrate the mode of operation of the operating pieces.
Figure 4B:
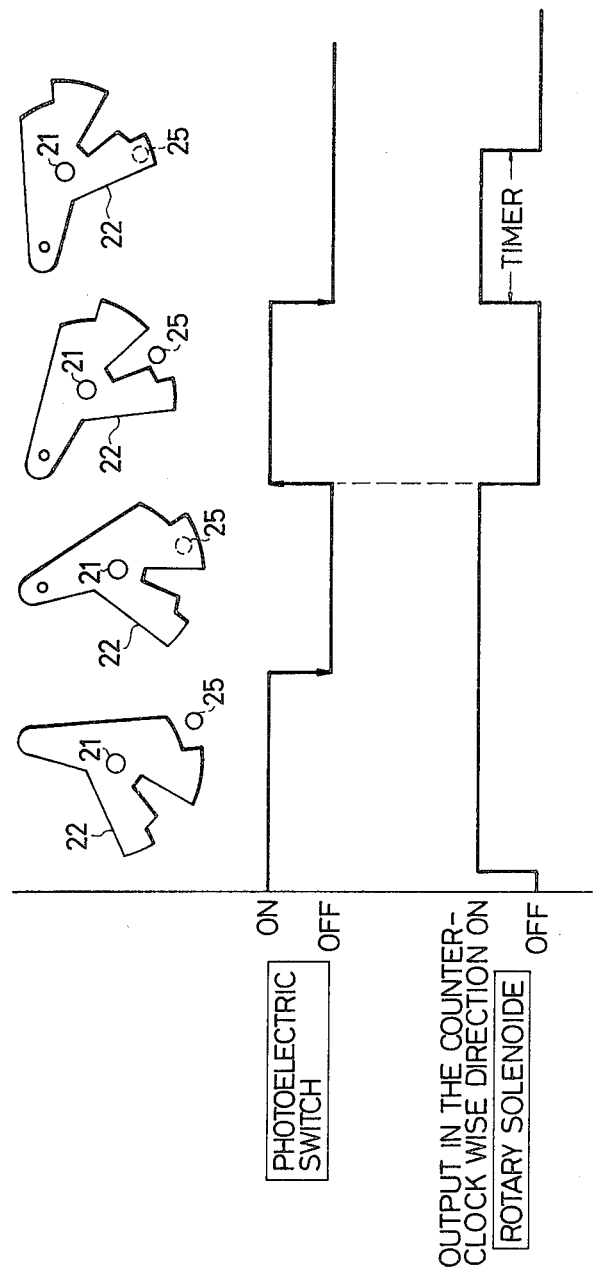

More specifically, the second shutter paddle drive system will be explained with reference to FIGS. 4(A) and 4(B). The output of the photoelectric switches are operated ON or OFF by a control part provided at the peripheral portion of the operating piece 22. (The control part comprises cut portions 26, 26' and non-cut portions 27, 27' and performs to reverse the output of the photoelectric switch 25.) In accordance with the ON or OFF output, the applications of current to the rotary solenoids is controlled so that after the application of the current to the rotary solenoids is started, it is turned OFF once when the photoelectric switch is switched form ON to OFF and thereafter, it is again turned ON when the photoelectric switch is switched from OFF to ON, and it may be turned OFF again if necessary. Thus, it is possible to silence undesired sounds and achieve a stable operation of the shutter paddle without substantially lowering the rotational speed of the shutter paddle 24.

The above-mentioned example is for the case where the operating piece 22 rotates in the clockwise direction. When the operating piece 22 rotates in the counter-clockwise direction, the application of the current to the rotary solenoids may be controlled so that it is stopped once when the photoelectric switch is switched from OFF to ON, and then turned ON again.

With respect to the first shutter paddle drive system, the same explanation described above is similarly applicable.

As is apparent from the above description, a shutter device of a photographic printer in which a shutter paddle is caused to move into and out of a printing optical path by means of a rotary solenoid, according to the invention, comprises two shutter paddles arranged on either side of the printing optical path; and two rotary solenoids for driving the shutter paddles, control being made in a manner such that, after one of the shutter paddles moves out of the printing optical path to start a printing exposure operation, the other shutter paddle moves into the printing optical path to end the printing exposure operation, the operations of the shutter paddles being switched for every printing exposure operation. Thus, the shutter device according to the invention exhibits a high response characteristic, and is high in reliability and uniformity in exposure.

What is claimed is:

1. A shutter device for a photographic printer in which a shutter paddle is caused to move into and out of a printing optical path by means of a rotary solenoid, comprising; first and second shutter paddles respectively arranged on either side of said printing optical path; first and second two-way energization type rotary solenoids for respectively independently driving said shutter paddle, said solenoids operating such that after a first of said shutter paddles is moved out of said printing optical path by operation of said first solenoid to start a printing exposure operation, the second shutter paddle is independently moved into said printing optical path by operation of said second solenoid to end said printing exposure operation, such that in successive printing exposure operations said shutter paddles are subsequently operated with the functions thereof reversed.

2. A shutter device as claimed in claim 1, further comprising means for controlling said solenoids such that said solenoids are alternately twice operated, whereby when one of said paddles is moved out of said optical path to start a printing operation, it then remains out of said optical path until moved to end a subsequent printing operation.

3. A shutter device as claimed in claim 2, said control means comprising photoelectric switches proximate said paddles, and control portions operatively connected to said paddles for selectively switching said photoelectric switches.

4. A shutter device as claimed in claim 3, said shutter paddles being rotationally mounted about two respective axes, and pivotally movable into and out of said optical path in response to movements of first and second operating pieces.

5. A shutter device as claimed in claim 4, said operating pieces being connected to said respective paddles by slide coupling means, said control portions being disposed on said operating pieces.

6. A shutter device of claim 4 wherein said two respective axes for said first and second shutter paddles are respectively on opposite sides of the optical path and in axial alignment with each other at the center of said optical path.

7. A shutter device of claim 4 wherein said control portions rotate on respective axes of rotation, and slide coupling means coupling said control portions to said paddles wherein said control portions selectively cover or uncover said photoelectric switches.

* * * * *